United States Patent [19]

Heinz

[11] 4,031,685

[45] June 28, 1977

[54] REINFORCING CAGE CONSTRUCTION

[76] Inventor: Robert F. Heinz, 3910 Pratt Lake Road, Gladwin, Mich. 48624

[22] Filed: Feb. 13, 1976

[21] Appl. No.: 657,992

Related U.S. Application Data

[63] Continuation of Ser. No. 517,489, Oct. 24, 1974, abandoned.

[52] U.S. Cl. .................... 52/653; 52/741; 138/176; 206/513
[51] Int. Cl.² ............ E04H 12/12; E04C 5/03
[58] Field of Search ............ 52/646, 648, 650–653, 52/741; 285/288, 230; 206/513; 138/175, 176

[56] References Cited

UNITED STATES PATENTS

| | | | |
|---|---|---|---|
| 849,922 | 4/1907 | Scofield | 52/687 |
| 1,413,008 | 4/1922 | Cuozzo | 285/288 |
| 1,447,421 | 3/1923 | Kircher | 138/175 |
| 1,986,172 | 1/1935 | Wilson | 52/650 |
| 2,736,453 | 2/1956 | Russell | 206/513 |
| 2,846,221 | 8/1958 | Skinner | 52/646 |
| 3,670,471 | 6/1972 | Smith | 52/638 |
| 3,744,207 | 7/1973 | Oraschakoff | 52/650 |

FOREIGN PATENTS OR APPLICATIONS 329,953    1903    France .................. 52/653

Primary Examiner—Price C. Faw, Jr.
Assistant Examiner—James L. Ridgill, Jr.
Attorney, Agent, or Firm—Learman & McCulloch

[57] ABSTRACT

Tubular wire grid reinforcing cages for concrete pipe or similar structures are constructed from a plurality of prefabricated peripheral segments or cage sections, each section extending the full axial length of the completed cage and defining a portion only of the peripheral extent of the cage. By prefabricating the cage sections as individual segments, the individual segments or cage sections can be more efficiently designed and constructed to counteract the stresses encountered in the completed pipe, which stresses differ substantially at various points about the pipe periphery. The segmental cage section construction further enables the prefabricated sections to be compactly nested for shipping and storage, as well as simplifying problems of constructing cages for bell mouthed pipe.

11 Claims, 11 Drawing Figures

REINFORCING CAGE CONSTRUCTION

This is a continuation, of application Ser. No. 517,489, filed in the U.S. Pat. Office on Oct. 24, 1974 now abandoned.

BACKGROUND OF THE INVENTION

While having applicability in other reinforced concrete structures, the present invention is primarily concerned with the construction of reinforcing cages for concrete pipe. Such pipe typically may be of a diameter of anywhere between 1 and 16 feet or more and is conventionally constructed in sections of axial lengths normally between 4 and 16 feet. The most frequently encountered pipe is constructed with a bell mouth at one end dimensioned to internally receive the end of an adjacent pipe section so that sealed joints between adjacent pipe sections can be achieved.

Because concrete is relatively weak in tension, it is standard practice to reinforce such pipe with a grid-like wire reinforcing cage which is embedded in the concrete during the molding or formation of the pipe. The cage consists in general of a grid-like wire mesh or lattice formed into an overall shape corresponding generally to that of the pipe section and dimensioned so that the cage is completely embedded within the concrete in the completed pipe. Many examples of such cages are found in the prior art.

Because an assembled reinforcing cage is awkward to transport in any substantial numbers, such reinforcing cages are almost invariably constructed at the pipe-making plant. Nearly all such cages are constructed by one of two methods. In the most frequently employed method, a wire mesh fabric, purchased in rolls or flat sheets, is rolled or formed into the desired tubular shape and welded along an axially extending seam line into the desired tubular configuration. This method presents certain problems in cage sections which must be formed with a bell mouth or spigot because the bell mouth or spigot portion of the cage must be of a different diameter than the main body portion.

In another frequently employed method, axially extending wire rods are laid upon a form and a circumferentially extending wire is helically wrapped around the axial wires and welded at each intersection of the axial and helical wires.

While a reinforcing cage of cylindrical configuration is normally employed on relatively small diameter pipe, the stresses and economics encountered in larger diameter pipe, particularly with relatively thick walled types, are such that cages of more refined and complex construction are required. When a pipe of circular transverse cross-section is laid in place upon its side, the loads applied to the pipe are such as to cause the pipe to tend to assume a flattened elliptical transverse cross-sectional shape. The stresses present are substantially greater at the top and bottom portions of the pipe, while the stresses present in the opposite side portions, at the 3:00 o'clock and 9:00 o'clock positions are substantially less. Further, the concrete is in compression at the outer surface of the pipe at the 12:00 and 6:00 o'clock positions and in tension at the inner surface at these two positions, while the reverse is true at the 3:00 o'clock and 9:00 o'clock positions. To compensate for this latter effect, the transverse cross-sectional configuration of the cage is frequently formed in an elliptical cross-section which is oriented within the pipe so that the cage is closer to those surfaces of the pipe where tension stresses are present. The variation in magnitude of stresses between the top and side portions of the pipe is frequently counteracted by adding additional reinforcement to the cage in those regions where the larger stresses are encountered.

Where thick walled pipe is employed, two or more concentric cages may be employed, the inner and outer cages frequently being coupled to each other by radially extending tie rods.

From the foregoing, it is believed apparent that construction of the cages of the more complex nature can require tooling, techniques and design talent which are not always readily available in a plant whose primary function is the production of concrete products. Manufacture of cages at specialized plants where production volume could support specialized tooling and design facilities has not been feasible because of the cost of transporting completed cages. Conventional or prior art cages of the same size cannot be nested or compacted for transportation and thus present an inordinately high bulk to weight ratio for shipping purposes in addition to the possibility of deforming the cage during shipment and handling.

The present invention is especially directed to a cage construction technique by which the construction of complex cage configurations or cages with bell mouth or spigot sections is simplified and which enables a more efficient use of cage material by employing different gauges or patterns of wire at various regions within the cage in accordance with the local stress requirements to be met, and which further enables shipment of prefabricated cage sections in compact self-braced nested bundles.

SUMMARY OF THE INVENTION

In accordance with the present invention, wire mesh reinforcing cages for concrete pipe or similar structures are constructed by final assembly at the pipe-making plant of a plurality of prefabricated cage sections, each of which constitutes a peripheral segment of the completed annular cage as viewed in its axial direction. For most concrete pipe of standard circular transverse cross-section, an annular cage is preferably assembled from four prefabricated sections of approximately equal arcuate extent for reasons discussed below. However, for very small cages, especially large cages (10 feet or more in diameter), cages without bell mouths, or structures of cross-sections other than circular, a greater or lesser number of prefabricated segmental sections may be preferable.

The prefabrication of individual cage sections constituting peripheral segments of a completed annular cage assembly for circular or substantially circular concrete pipe presents several fundamental advantages.

First, as discussed above, the magnitudes of stresses in a concrete pipe of circular cross-section vary around the pipe's circumference. In analyzing the stresses it is conventional to divide the pipe, as viewed in transverse cross-section, into quadrants which are usually identified as the "crown" (a quadrant centered at the 12:00 o'clock position), the "invert" (that quadrant centered at 6:00 o'clock) and "springing" quadrants centered at the 3:00 and 9:00 o'clock positions.

Although the term "quadrant" is employed, the angle subtended by a particular quadrant may in practice be somewhat less or somewhat greater than 90°.

As stated above, when the pipe is laid with the pipe axis extending horizontally, the maximum stress occurs in the crown and invert portions of the pipe, hence if the reinforcing cage is assembled from four prefabricated cage sections, one for the crown, one for the invert, and two for the springings, the crown and invert sections may readily be made with a heavier and more extensively reinforced construction than is employed for the companion springing sections. Further, because the stresses vary from maximum tension at the inner surface at 12:00 and 6:00 o'clock to a maximum compression at the inner surface at 3:00 and 9:00 o'clock, the tensible force is at a minimum approximately midway between these four points, and thus the joint between quadrant sections in the assembled cage can lie at a region of minimum stress.

Further, the construction employing prefabricated arcuate sections is readily adapted to the construction of cages of elliptical transverse cross-section, in which the crown and invert sections are formed to a first degree of curvature and the springing sections are formed to a different curvature.

The construction of cages with enlarged diameter bell mouths or reduced diameter spigots is likewise greatly simplified because these sections are simply laid up with arcuate wires of the desired curvature in accordance with the present invention, whereas the conventional one piece rolled wire mesh cage requires special techniques to form a reduced or enlarged diameter section.

The prefabricated segmental construction is also of a substantial advantage for purposes of storing and shipment because like sections can be stacked in a nested relationship to consume a minimum amount of space.

Other objects and features of the invention will become apparent by reference to the following specification and to the drawings.

IN THE DRAWINGS

Figure 1:
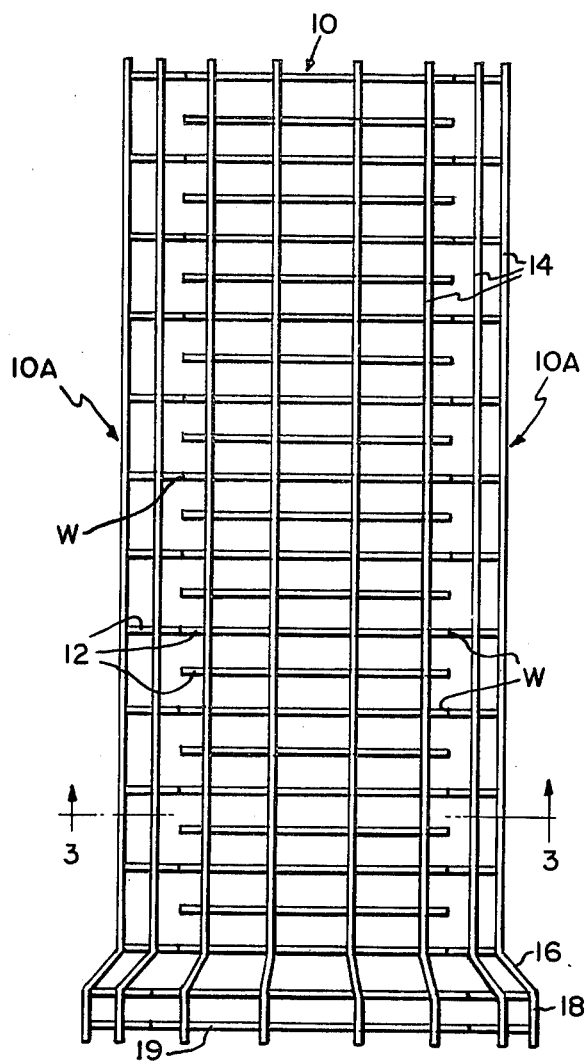
FIG. 1 is a side view of a reinforcing cage embodying the present invention.

The present invention is especially well adapted to the construction of tubular reinforcing cages of wire or rod components assembled into a grid-like reinforcing structure. A primary, but not exclusive, use of such cages is for reinforcing relatively large diameter concrete pipe which, in some instances, require reinforcing cages of sophisticated design and complex construction. The present invention is especially concerned with a technique for constructing such cages which is readily adaptable to variations in cage design and which in many instances greatly simplifies the construction process and conserves material. Because the present invention produces individual cage sections of configurations such that they can easily be nested and stacked for shipment, the invention further permits the cage to be constructed in a facility especially designed for that purpose where specialized tooling and mass-production facilities beyond the means of the usual pipe-making can be employed.

In accordance with the present invention, a completed tubular reinforcing cage is constructed by first prefabricating a number of individual cage sections, each conformed to constitute one circumferential segment of the completed cage. Such an individual cage section designated generally 10 is shown in FIGS. 2 and 4. In the example of FIGS. 1 through 4, the particular cage illustrated involves a completed cage of generally cylindrical configuration which is to be employed in a round concrete pipe having a conventionally shaped bell mouth at one end.

The individual cage section 10 shown in FIGS. 2 and 4 is constructed from a plurality of arcuately formed wire or rod members 12 which are assembled into axially spaced coaxial relationship with each other by a plurality of axially extending wire or rod members 14 welded or otherwise fixedly secured to wires 12 at each intersection. At the end of cage section 10 which is to be located in the bell mouth of the completed pipe, the axially extending wires 14 are formed with a radially outwardly inclined section 16 which intergrally joins the main body of wire 14 to a parallel and radially offset end section 18. One or more arcuate wires 19 are welded to the offset sections 18, the arcuate wires 19 having a greater radius of curvature than arcuate wires 12, but being centered on a common axis with that of wires 12.

In the embodiment of FIGS. 1 through 4, the completed cage is made up of four individual cage sections and the curvature of arcuate wires 12 and 19 is such that they subtend an angle of between 75° and 105° about the axis of their center of curvature.

Figure 2:
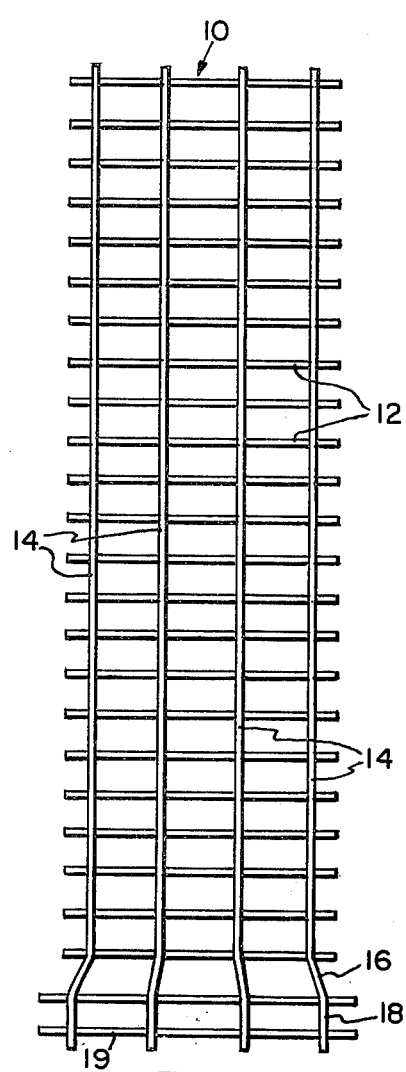
FIG. 2 is a top plan view of a prefabricated section of the cage of FIG. 1.

In FIG. 1, an assembled cage is shown in which four sections 10, 10a have been welded together at weldments W to form the completed generally cylindrical structure. For reasons discussed below, the stresses applied to a pipe in its finally installed condition are not uniform around the pipe circumference, and thus the assembled cage shown in FIG. 1 is made up of two like diametrically opposed sections 10 and two like, diametrically opposed sections 10a, the sections 10a differing from the construction of the sections 10 in that every other arcuate wire 12 along the main body portion of the section 10a has been omitted.

Figure 3:
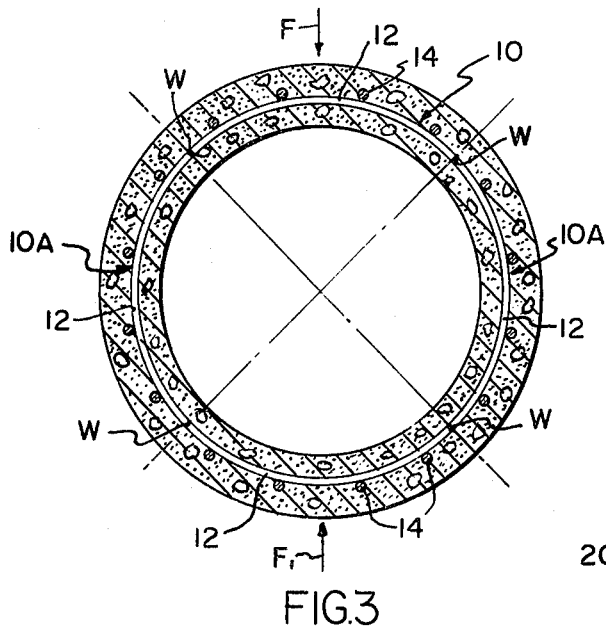
FIG. 3 is a transverse cross-sectional view of a circular pipe showing a cylindrical cage constructed from four individual prefabricated sections of the type shown in FIG. 1.
Figure 4:
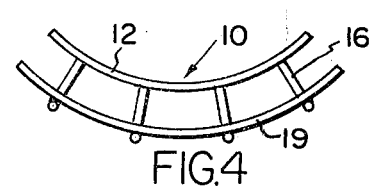
FIG. 4 is an end view of the cage section of FIGS. 1 and 2.

In FIG. 3, a transverse cross-sectional view of the assembled cage of FIG. 1 embedded in a concrete pipe is shown.

The view of FIG. 3 may be assumed to be that of the pipe in its finally installed position in which the pipe is buried in the earth with its axis extending horizontally. In the buried pipe, the load applied to the pipe consists essentially of forces acting in a vertical direction indicated by the directional arrows at F and F1. The forces applied schematically illustrated at F are composed essentially of the weight of the pipe itself combined with that of the earth bearing down against the top of the pipe while a reactive force acts upwardly at F1. It is believed apparent that the vertical squeeze thus applied to the pipe would tend to flatten the pipe out into an elliptical shape in which the overall vertical dimension of the pipe was reduced from the circular configuration of FIG. 3 and the horizontal dimension was increased. Because concrete is relatively strong in compression and relatively weak in tension, areas in which tension exists are of primary concern from the standpoint of reinforcement. By imagining the circular pipe as shown in FIG. 3 to be vertically squeezed into a horizontally elongated elliptical configuration, it is seen that tension forces will be present in the inner surface of the pipe at the top and bottom and will similarly be present in the exterior of the pipe at the opposite sides.

Thus, the reinforcing action needed at the top and bottom of the pipe is greater than that needed along opposite sides, and in assembling the reinforcing cage from the quarter sections 10, the cage sections are oriented so that cage sections 10 are located at the crown (top) and invert (bottom) quadrants, these quadrants being centered at the 12:00 o'clock and 6:00 o'clock positions, while the less heavily reinforced cage sections 10a constitute the springing quadrants, centered at the 3:00 o'clock and 9:00 o'clock positions. By eliminating every other arcuate reinforcing member 12 from quadrants 10a, a substantial saving in material is accomplished while at the same time achieving adequate reinforcement in the springing quadrants, and the crown and invert sections made up by quarter sections 10 can be more heavily reinforced. Alternatively, different gauges of wire can be employed as between crown and invert sections and springing sections.

Figure 5:
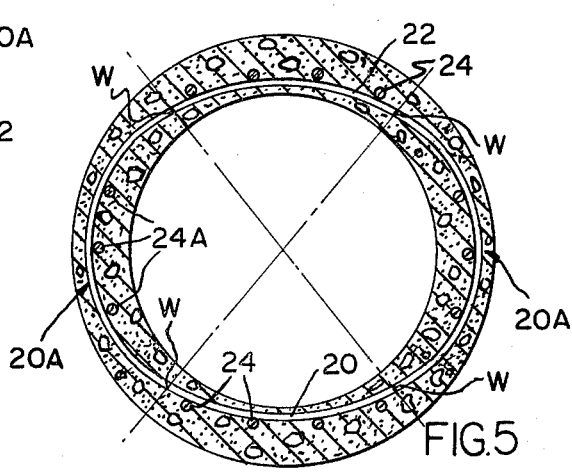
FIG. 5 is a transverse cross-sectional view through a cylindrical pipe showing an elliptical cage constructed in accordance with the present invention.

It will be noted that such an arrangement requires that the top of the pipe be identified, and this practice is quite conventional, because in many instances cages of elliptical cross-sectional configuration, such as that shown in FIG. 5 are employed. In FIG. 5, the cage of elliptical cross-section is made up of two like crown and invert sections 20 and two like springing sections 20A. The overall construction of cage sections 20 and 20A is similar to the construction of cage section 10, arcuate members 22 being secured into the curved grid-like arrangement by axially extending members 24 welded to members 22 at the various intersections. Where an elliptical cross-sectional cage is employed, the axially extending reinforcing wires 24 of the crown and invert sections are preferably welded to the arcuate members on the outer or convex side, while the members 24a in the springing sections 20A are welded on the inner or concave side of the cage section. This arrangement places the axial wires in the thicker side of the concrete shell.

In the cylindrical cage construction of FIGS. 1 through 4, the circumferential extent of the individual sections was approximately 90° — in the elliptical section of FIG. 5, the angular extent of crown and invert sections 20 is somewhat less than 90°, while the angular extent of the springing sections 20A is correspondingly increased.

The present invention is particularly well adapted to forming cages of the construction illustrated in FIG. 5 in that the arcuate wires 22 and 22a can be accurately shaped upon a form to follow the true elliptical curvature. In conventional practice, cages of elliptical cross-section are frequently formed simply by constructing a cylindrical cage and then flattening it to deform it into an approximate elliptical configuration.

The multiple prefabricated section construction is also advantageous to a cage of the configuration of that illustrated in FIG. 5 in that it is a simple matter to locate the axial wires 24, 24a on the convex or concave sides of the arcuate wires.

Figure 6:
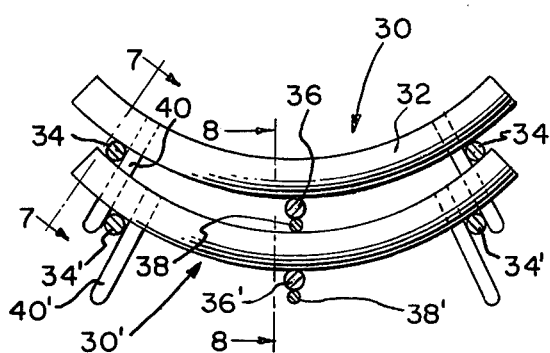
FIG. 6 is a detailed cross-sectional view, taken on a radial plane, showing a pair of cage sections in a stacked nested relationship.
Figure 7:
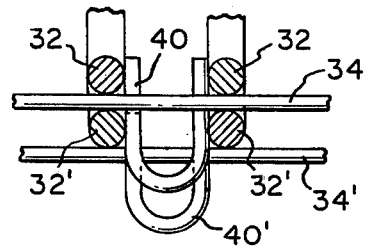
FIG. 7 is a detailed end view of the cage sections of FIG. 6 taken on line 7—7 of FIG. 6.

The individual cage sections may be stacked in a nested relationship for purposes of shipment in the manner shown in the cross-section view of FIG. 6. Because the individual cage sections have a finite radial thickness the sections will not nest perfectly in that the radius of the section on its convex side is greater than the radius on its concave side by an amount equal to the sum of the diameters of the arcuate and axial wires. In FIG. 6, the proportions of the cage sections have been exaggerated to more clearly show this problem.

In FIG. 6, a cage section designated generally 30 is stacked upon a similar cage section 30'. Arcuate member 32 of cage section 30 is shown as having secured thereto axially extending wires 34 and 36. It will be noted that when the sections 30 and 30' are in the nested engagement shown in FIG. 6, the two outer axial wires 34 of cage section 30 are seated upon the underlying cage section 30', but the central axial wire 36 of cage section 30 is spaced above and out of contact with cage section 30'. Because it is desired to stack a relatively large number of cage sections in a single stack, it is desired that the individual sections be adequately supported in the stack, because otherwise the weight of the stack would tend to straighten out or increase the radius of curvature of the sections located near the bottom of the stack.

Figure 8:
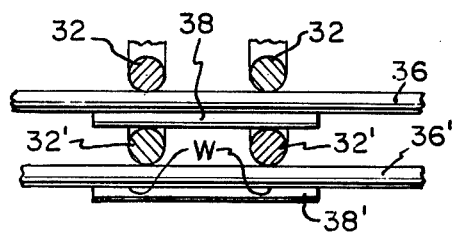
FIG. 8 is a detailed cross-sectional view taken on line 8—8 of FIG. 6.

In order to prevent this from happening, each cage section is provided with a number of stacking wires 38 having a diameter chosen to provide the necessary support of one cage section upon another near the arcuate center portion of the cage. In FIG. 6, a stacking wirre 38 located near the mid-point of the arcuate wire 32 is welded to an axial wire 36 as best seen in FIG. 8 to provide the necessary support for the central portion of the cage section. Stacking wires 38 may be axially spaced from each other as required in accordance with the axial length and weight of the individual cage sections and the number of sections to be loaded into a given stack.

The cage sections may further be provided with mold spacers in the form of generally U-shaped spacer wires 40 welded in position upon an axially extending wire 34. Spacers 40, as best seen in FIG. 6, project generally radially and are located to engage an axial wire 34' of an underlying cage section to lock the stacked sections in the desired circumferentially aligned relationship. The mold spacer also projects between two arcuate members 34' to limit axial displacement of the stacked sections. When the cage sections are assembled into a completed cage and inserted into a mold for forming the pipe, the projecting mold spacers 40 engage the side of the mold wall to accurately locate the assembled cage section within the mold.

Figure 9:
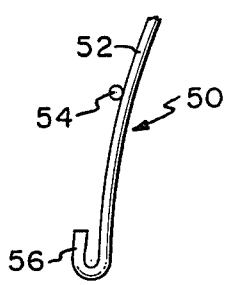
FIG. 9 is a detail end view of a modification of the invention.
Figure 10:
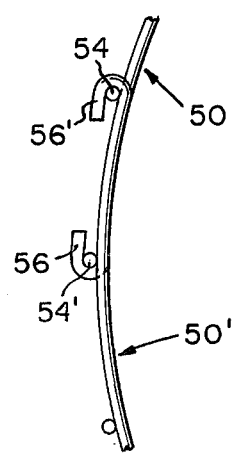
FIG. 10 is a view similar to FIG. 9 showing two sections in assembled relationship.
Figure 11:
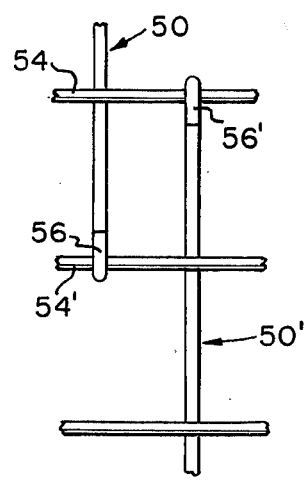
FIG. 11 is a detail side elevation of the sections of FIG. 10.

In the embodiments described thus far, it has been assumed that in the final assembly of the cage sections into the assembled cage, the arcuate wires of adjacent sections will be welded to each other. Because the primary function of the arcuate wires is to absorb tensile stresses in the assembled pipe, assembly of cages can be facilitated by forming a hook-shaped portion 56 (FIG. 9) at each end of an arcuate wire 52 of a cage section 50. The bight of hook 56 is dimensioned to receive an axial wire 54' of an adjacent cage section. As best seen in FIGS. 10 and 11 the bight 56 of the hook of a first section 50 passes around and receives an axial wire 54' of an adjacent cage section 50', while the bight portion 56' of cage section 50 similarly receives an axial wire 54 of cage section 50. While this coupling is active only in tension, tension forces are the only forces the coupling is required to resist in order to perform its intended function. This joint is not flexible and holds the cage sections in rigid relationship during handling. The hooks may be crimped closed after assembly, if desired.

The embodiments described above are all directed to what will be referred to as quadrant cage sections where four sections are necessary to construct the tubular cage assembly. Because of the loading applied to the completed pipe, the quadrant or four-section unit is of general applicability in cylindrical and elliptical pipe sections, as well as in arch pipe. In certain specialized applications other than concrete pipe, the tubular cage may be made up on a greater or lesser number of individual cage sections. As a practical matter, nesting of cage sections for stacking purposes becomes somewhat difficult when the arcuate extent of the section approaches or exceeds 120°, while increasing the number of cage sections employed in each tubular unit begins to approach an undesirable complication of the final assembly process in which the sections are assembled into the completed cage. The cage sections herein disclosed have all been directed to single cages, however, it is believed apparent that the construction is equally well adapted to multiple layer cages of the type employed in relatively thick wall pipe.

Therefore, the foregoing description is to be considered exemplary rather than limiting, and the true scope of the invention is that defined in the following claims.

What is claimed is:

1. A prefabricated cage section for constructing a tubular wire mesh reinforcing cage for concrete pipe or like structures; said section comprising a plurality of arcuate wire members and a plurality of axially extending wire members fixedly secured to said arcuate members at one of the concave and convex sides thereof to define an arcuate grid structure conformed to constitute a full length quadrant segment of less than 120° arcuate extent of a tubular wire reinforcing cage, and stacking elements fixedly mounted at spaced locations on one of the concave and convex sides of said grid structure and projecting radially from said one of said sides by a distance such that a curved surface containing those points of said arcuate grid lying at a minimum radial distance from the axis of arcuateness at the concave side of said grid is congruent with a curved surface containing those points of said arcuate grid lying at a maximum radial distance from said axis at the convex side thereof whereby like sections can be stacked in concave to convex side nested relationship with each section contacting the next adjacent section at least three peripherally spaced support locations.

2. A pair of like prefabricated cage sections for constructing a tubular wire mesh reinforcing cage for concrete pipe or like structures; each section comprising a plurality of arcuate wires and a plurality of axially extending wires fixedly secured to said arcuate wires to define an arcuate grid structure conformed to constitute a full length quadrant segment of less than 120° arcuate extent of a tubular reinforcing cage, said axial wires being located on one of the concave and convex sides of said arcuate wires, said sections being stackable in nested concave to convex side relationship with the two outermost axially extending wires of one section in supporting engagement with the arcuate wires of the other section to provide two circumferentially spaced points of supporting engagement between the nested sections, and stacking element means fixedly mounted on at least one of said sections and projecting radially therefrom to engage arcuate wires of the other of said sections when said sections are in stacked nested relationship to provide points of support for the uppermost of the stacked sections at a location circumferentially between said two circumferentially spaced points of support.

3. The invention defined in claim 2 further comprising mold spacing means fixedly mounted on each of said sections and projecting radially outwardly from the convex side of the section by a distance corresponding to the desired depth of embedment of the cage within a concrete pipe or like structure, the mold spacing means on one of said sections being located to engage and project radially through and beyond the wires of the other of said sections when said sections are in nested relationship with each other to restrain the two nested sections against axial movement relative to one another.

4. A pair of like prefabricated cage sections for constructing a tubular wire mesh reinforcing cage for concrete pipe or like structures; each section comprising a plurality of arcuate wires and a plurality of axially extending wires fixedly secured to said arcuate wires to define an arcuate grid structure conformed to constitute a full length quadrant segment of less than 120° arcuate extent of a tubular reinforcing cage, said axial wires being located on one of the concave sides of said arcuate wires, said sections being stackable in nested concave to convex side relationship, mold spacing means fixedly mounted on each of said sections and projecting radially outwardly from the convex side of the section by a distance corresponding to the desired depth of embedment of the cage within a concrete pipe or like structure, the mold spacing means on one of said sections being located to project through and beyond the wires of the other of said sections when said sections are in nested relationship with each other to restrain the two nested sections against axial movement relative to one another.

5. A tubular wire reinforcing cage for concrete pipe or like structures comprising a pair of like first cage sections constituting the crown and invert quadrants of said cage, a pair of like second cage sections constituting the opposed springing quadrants of said cage, each of said sections including a plurality of arcuate circumferentially extending wires and a plurality of axially extending wires fixedly secured to said arcuate wires to conform each section into a full axial length quadrant section of the completed cage, at least some of the arcuate wires on each section projecting circumferentially beyond the outermost axial wire of the section and having a reversely bent hook-shaped end portion located to receive and retain an axially extending wire of an adjacent section to secure the adjacent sections to each other.

6. Two pair of prefabricated cage sections for constructing a tubular wire mesh reinforcing cage for concrete pipe or like structures; each section comprising a plurality of arcuate wires and a plurality of axially extending wires fixedly secured to said arcuate wires to define an arcuate grid structure conformed to constitute a full length quadrant segment of a tubular reinforcing cage, an axial wire on one of said pair of sections being located on the concave side of the arcuate wires, and on the other pair of sections being located on the convex side of the arcuate wires, like sections being stackable in nested concave to convex side relationship with the two outermost axially extending wires of the section of each pair of sections in supporting engagement with the arcuate wires of the other one of each pair of sections to provide two circumferentially spaced points of supporting engagement between each pair of nested sections, and stacking element means fixedly mounting on one of said sections of said each pair of sections and projecting radially therefrom to engage arcuate wires of the other one of said each pair of sections when said sections are in stacked nested relationship to provide points of support for the uppermost of the stacked sections at a location circumferentially between said two circumferentially spaced points of support.

7. The invention defined in claim 6 further comprising mold spacing means fixedly mounted on each of said sections and projecting radially outwardly from the convex side of the section by a distance corresponding to the desired depth of embedment of the cage within a concrete pipe or like structure, the mold spacing means on one of said sections being located to engage and project beyond an axially extending wire of the other of said sections when said sections are in nested relationship with each other to restrain the two nested sections against peripheral movement relative to one another.

8. The method of making a tubular wire mesh reinforcing cage for concrete pipe ro the like comprising the steps of prefabricating each of a first pair of like cage sections by fixedly securing a plurality of axially extending first wires to a plurality of first arcuate wires to form a wire mesh grid constituting a full length first quadrant section of the completed cage, prefabricating each of a second pair of like cage sections by fixedly securing a plurality of axially extending first wires to a plurality of second arcuate wires to form a wire mesh grid constituting a full length second quadrant section of the completed cage, the second wires in one of said second quadrant sections possessing in their aggregate a different strength from that of the aggregate strength of the first arcuate wires of one of said first quadrant sections, and assembling the two pairs of sections into a tubular cage with the quadrant sections of said first pair of sections located at diametrically opposed positions constituting the springing quadrants of the cage and the quadrant sections of said second pair of sections connected circumferentially between the sections of said first pair at diametrically opposed positions and constituting the crown and invert quadrants of the cage.

9. The method defined in claim 8 comprising the further step of forming a radially offset bell mouth section on each of said cage sections during the prefabrication steps.

10. The method of claim 8 further comprising the steps of forming reversely bent hook portions at the ends of at least some of the arcuate wires of each of said sections, and wherein the step of assembling said sections into a tubular cage comprises the step of engaging the hook portions of one quadrant section with the axially extending wires of an adjacent quadrant section.

11. The method of producing a concrete pipe reinforcing cage, said cage having a generally elliptical cross section, said method comprising the steps of prefabricating a first pair of crown and invert quadrants having the shape of circular arcs in end view and having a radially offset bell mouth section at one end, prefabricating a second pair of springing quadrants having the shape of circular arcs in end view and having a radially offset ball mouth section at the end, and fixedly securing said first pair of quadrants to said second pair of quadrants to assemble the generally elliptical cage.

* * * * *